US005831519A

United States Patent [19]

Pedersen et al.

[11] Patent Number: 5,831,519

[45] Date of Patent: Nov. 3, 1998

[54] TRAFFIC SUPERVISION SYSTEM FOR VEHICLES

[76] Inventors: Heine Ewi Pedersen, Sydskraningen 1, DK-2800 Lyngby; John Harder, Viborggade 8, st.th., DK-2100 Copenhagen Ø; Flemming Lohmann-Jensen, Jensløvs Tværvej 13, 3.th, DK-2920 Charlottenlund, all of Denmark

[21] Appl. No.: 836,723

[22] PCT Filed: Nov. 21, 1995

[86] PCT No.: PCT/DK95/00460

§ 371 Date: Jul. 21, 1997

§ 102(e) Date: Jul. 21, 1997

[87] PCT Pub. No.: WO96/16387

PCT Pub. Date: May 30, 1996

[30] Foreign Application Priority Data

Nov. 22, 1994 [DK] Denmark .......................... 1332/94

[51] Int. Cl.6 .......................... B60Q 1/00

[52] U.S. Cl. .......................... 340/425.5; 340/431; 340/988; 340/989; 340/991; 701/35

[58] Field of Search .......................... 340/988, 989, 340/991, 994, 438, 440, 429, 425.5, 431; 364/443, 449.7, 460, 424.024, 424.037; 701/35, 207

[56] References Cited

U.S. PATENT DOCUMENTS

| | | | |
|---|---|---|---|
| 5,014,206 | 5/1991 | Scribner et al. | 364/449 |
| 5,025,253 | 6/1991 | Dilullo et al. | 340/825.06 |
| 5,142,278 | 8/1992 | Moallemi et al. | 340/825.06 |
| 5,347,274 | 9/1994 | Hassett | 340/988 |
| 5,475,597 | 12/1995 | Buck | 364/443 |
| 5,631,642 | 5/1997 | Brockelsby et al. | 340/993 |
| 5,652,707 | 7/1997 | Wortham | 364/460 |

FOREIGN PATENT DOCUMENTS

WO94/05536 3/1994 WIPO .

*Primary Examiner*—Thomas J. Mullen, Jr.
*Assistant Examiner*—Ashok Mannava
*Attorney, Agent, or Firm*—Jacobson, Price, Holman & Stern, PLLC

[57] ABSTRACT

A traffic supervision system for transport systems (17) of the type comprising a towing unit and one or more transporting or transported units, the towing unit having a data processing unit (1) with transmit and receive facilities adapted to read/write messages from stationarily located tags (10B) or to transmit information via a wireless transmission (7) in which the towed, transporting or transported unit or units have another data processing unit (15) having transmit and receive facilities capable of exchanging information with the data processing unit (1) in the towing unit via a wireless transmission (7) or via an interface (8).

8 Claims, 3 Drawing Sheets

TRAFFIC SUPERVISION SYSTEM FOR VEHICLES

Figure 1:
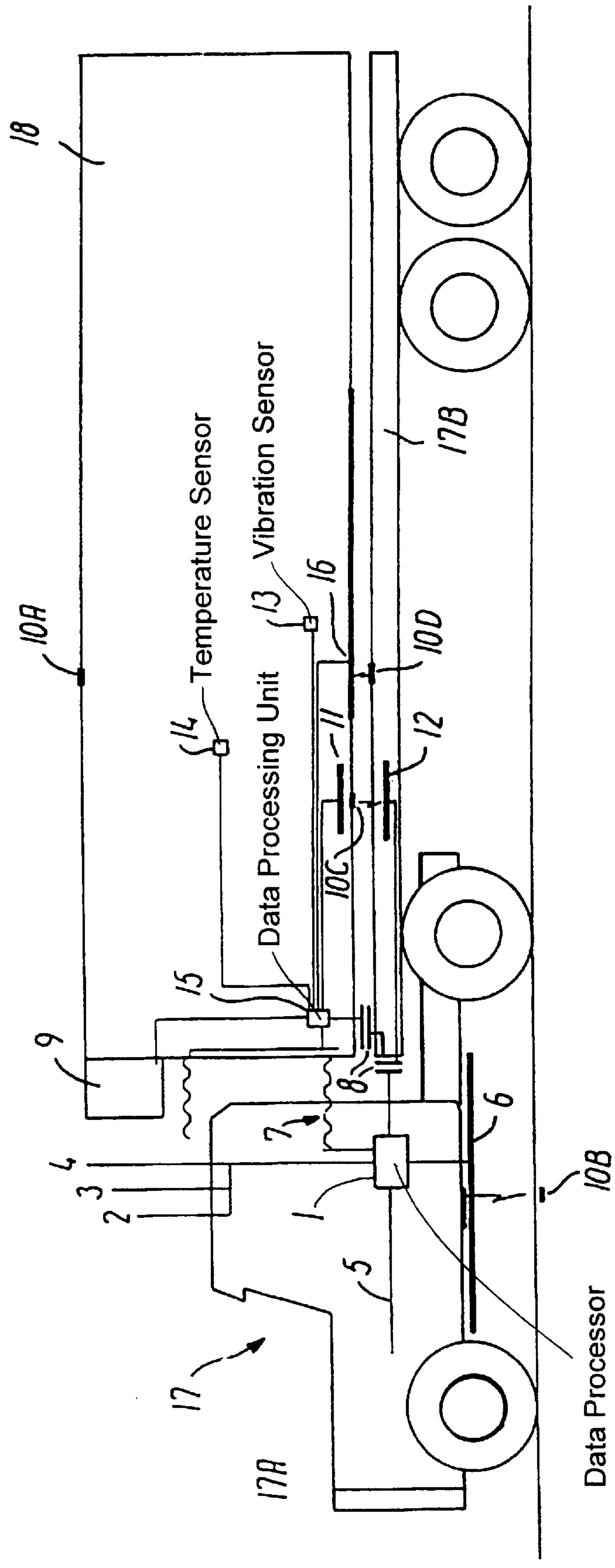

The invention concerns a traffic supervision system for vehicles of the type comprising a towing unit and one or more towed or transported units, said towing unit comprising:

A data processing unit having transmit and receive facilities adapted to read/write messages from stationarily positioned tags, or to read/write via a wireless transmission.

Such a traffic supervision system is known from DK patent application No. 1095/94. This system is extremely useful in connection with the supervision of vehicles, e.g. for identification of vehicles and determination of their positions.

In connection with two-part vehicles, e.g. a truck consisting of a motor vehicle and an attached trailer, it is not quite expedient that all the data facilities are present just in the towing unit, i.e. in the motor vehicle. This means that communications between towing and transporting or transported units are interrupted upon disengagement from the towing unit.

Where a trailer and a motor vehicle, even if the motor vehicle has data processing facilities, are left at a parking ground, the trailer is extremely vulnerable to being stolen or vandalised. In this connection it is clear that if the vehicle is a refrigerator vehicle with meat or other expensive goods, it is very great values that may be lost.

Accordingly, the object of the invention is to improve the existing system known from the above-mentioned DK patent application such that the same safe supervision and position determination of a transporting or transported unit, which is e.g. left at a parking ground, is achieved.

This object is achieved according to the invention in that the towed or transported unit or units have another data processing unit with transmit and receive facilities capable of exchanging information with the data processing unit in the towing unit via a wireless transmission or via an interface.

It is hereby ensured that the towed or transported unit, no matter whether it is coupled to a towing unit or is left on a parking ground, is safely protected against theft and other vandalism, since the data processing facilities in the towed unit will instantaneously respond to abnormal events and notify the data processing unit in the towing unit which can advise the police and the like.

It is expedient according to the invention, that the data processing unit of the towed or transported unit or units can exchange information with local data processing units which are stationarily located outside the towing unit.

A system is hereby established wherein the towed or transported unit, when left alone at a terminal, is watched just as safely as if it was coupled to a towing unit.

Further, it is expedient, that the towed or transported unit or units have a first aerial capable of reading the information from a tag which is positioned on the transported unit or units.

The transported unit and the transporting unit will hereby be linked up very closely with-each other, in the sense that when the aerial tries to read the tag, it will be detected instantaneously if the tag is no longer present, e.g. if it has been attempted to remove the transported unit. In that case, the data processing unit in the transported unit immediately states that it is not at the location where it ought to be, which can take place in that it immediately signals a local data processing unit which can immediately pass on the signals to the police or the like.

When, the transported unit or units have a tag capable of receiving or transmitting instructions or information from the data processing unit via another aerial which is also located on the transported unit, the transported unit can advantageously provide information on its position. Information and instructions can also be read by a portable device. Similarly, the data processing facilities in the towing unit can write to and read from the same tag via an aerial on the transporting unit. This opens up the possibility of protection against loss of data related to e.g. the course of the transport concerned.

It is also expedient that the transported unit or units have another tag located on the upper side of the towed unit or units.

This is particularly expedient if it is imagined that the transported units are formed by stackable containers. In that case, each individual container can easily be identified and be positioned, since the first container placed directly at a parking ground or terminal is positioned by reading of tags burried in the surface dressing of the ground or the terminal, and when the next container is stacked, the next container can read the identity of the lower container, whereby the position is determined unambiguously. If it is attempted to remove one of the containers, the container being removed cannot read the identification on the container below it, and the data processing facilities on the container which has been removed, will therefore immediately give the alarm.

The same principle of positioning may be applied on ships equipped with data processing facilities and tags in surfaces on decks.

The data processing unit of the towing unit and the stationarily located data processing units may communicate with the satellite, GSM or GSP system.

This provides a very certain position determination no matter where the towing unit is present, and opens up the possibility, via one of these systems, of inquiring for the state and position of the transported unit or units or for remote activation of facilities in the individual transported unit.

Sensors, such as vibration sensors and temperature sensors, may also be connected to the data processing units of the transported unit or units.

This improves the certainty that any undesired removal of a transported unit will be detected, since a vibration sensor immediately signals the data processing facilities of the transporting unit and gives the alarm in the same manner as before.

Similarly, temperature sensors located in combination with data processing facilities in the transporting unit can give the alarm in case of inexpedient temperature changes and, via communication with the data processing facilities in the towing unit or at the terminal, inform the carrier or owner of the freight of the present condition in the transported unit.

In general, expedient embodiments of the invention are defined in the dependent claims.

Figure 2:
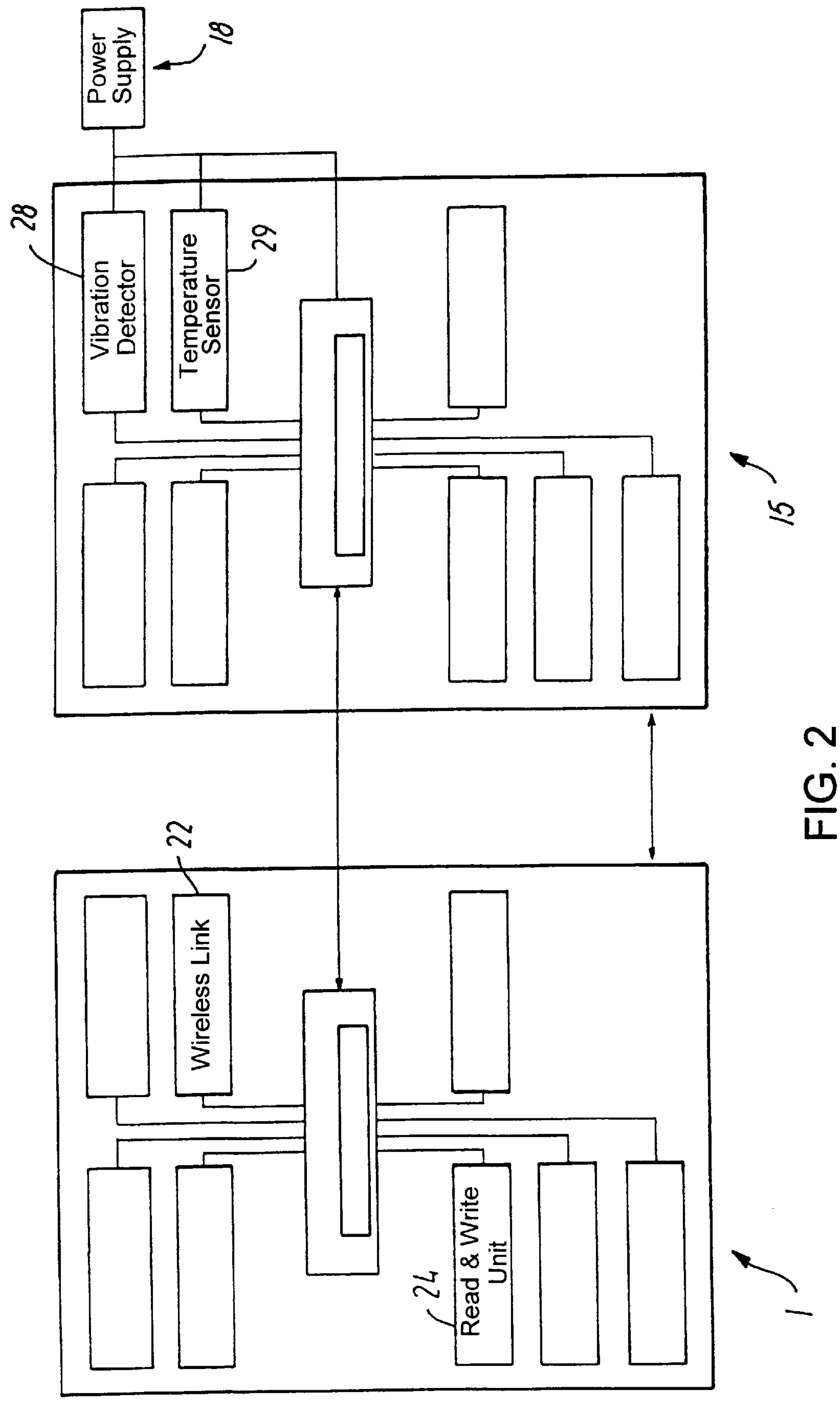
Figure 3:
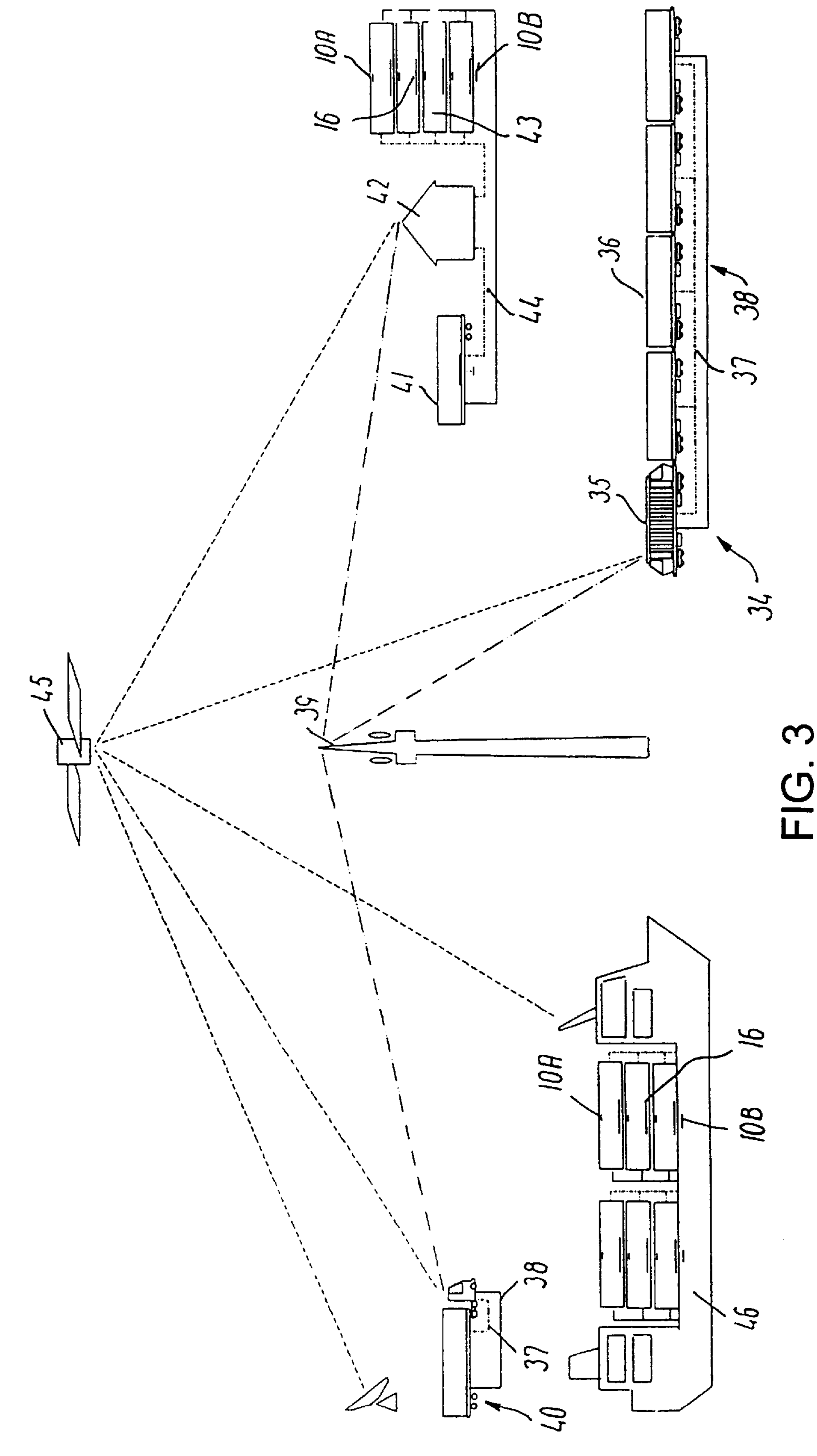

The invention will be explained more fully below with reference to the drawing, which shows a preferred embodiment of the invention, and in which FIG. 1 shows a truck consisting of a motor vehicle and a trailer which transports a container with associated data processing facilities, FIG. 2 is a block diagram of the data processing facilities in the motor vehicle and a transported container, and FIG. 3 shows the invention applied in connection with e.g. a train and connected to a satellite, GPS and GSM system.

FIG. 1 shows a transport unit, here shown as a unit consisting of a motor vehicle and a trailer transporting a container. In other words a transport unit which is of a type having a towing unit and a towed or transporting unit loaded with a transported unit (container). Of course, any other transport unit may be contemplated, e.g. a train having a locomotive and several carriages or a ship. In the motor vehicle, 1 designates data processing facilities which communicate with a satellite, a GSM system and a GPS system, respectively, via aerials 2, 3, 4. Further, the bottom of the motor vehicle is provided with an aerial 6 capable of reading a tag 10B, which may be located on a road, a parking ground or even on a ship.

In this specification tag means a microchip having an aerial, transmit and receive facilities, a memory as well as a passive inductive source of energy (i.e. own power supply).

7 designates a radio link to a data processing unit 15 located in the transported unit. The data processing unit 15 essentially corresponds to the data processing 1, but with the difference that it does not have independent communications facilities to the satellite, GSM or GPS system. As moreover appears from FIG. 1, the bottom of the transported unit is provided with an aerial 16 capable of communicating with a tag 10D which is located on the transported platform. Further, a transmit aerial 11 is provided for the data processing unit 15, capable of transmitting information to and reading information from a tag 10C located on the transported unit. As will be seen, the transporting platform 17B is moreover provided with an aerial 12 having an interface 8 to the data processing system 1 in the towing unit 17A, enabling the towing unit to read from and write to the tag 6. Finally, various sensors, such as a temperature sensor 14 or a vibration sensor 13, are associated with the data processing unit. The interface 8 may be used instead of the wireless link 7 for communication between the motor vehicle and the transporting or the transported unit.

The data processing system 15 shown in FIG. 1 may be located in all types of towed platforms with permanent structures, or in containers and swap/flex platforms. Via the aerial 16, the data processing system can read information from the tag 10D located on the transporting unit 17B, or from the tag 10B located in a road or in a surface dressing on a ship, terminal or parking ground. If a transporting unit is removed, or a transporting unit and a transported unit are separated, such removal will be recorded by the data processing system, and an alarm procedure will be implemented.

Via aerials 11 and 12 located in the transported and transporting unit, both the data processing system 1 and the data processing system 15 can read from and write to the tag 10C located in the transported unit. The tag 10C may contain information for identification of the transported unit as well as data and information related to the course of the transport concerned. Consequently, the tag 10C may be used as a backup function for the overall amount of information related to the transport concerned, no matter whether the information and data are collected or generated in the data processing system 1/15 in a towing unit 17A, a transporting unit with a firm superstructure 17B or a transported unit 18. Information in the tag 10C may moreover be read using a portable device.

Where the transporting unit 17B or the transported unit 18 is left at a terminal or parking ground disconnected from the data processing system 1 in the towing unit 17A, any attempt at removing the trailer will be recorded by the vibration sensor 13, which instantaneously notifies the data processing system 15 which can give the alarm to the nearest, stationarily located data processing unit via its transmit/receive facilities.

If it is imagined that the transporting unit 17B or the transported unit 18 is stackable, the first and lowermost unit in a stack can read the tag 10B, located in a surface on a ship, a terminal or a dressing on a traffic ground, via the aerial 16 in the bottom of the unit, and pass on read information and own data via transmit/receive facilities to stationarily located data processing systems 42/44. The next unit in the stack can read the tag 10A, located in the top on the underlying unit, by means of a corresponding aerial, and likewise pass on read information and own data via transmit/receive facilities to the stationarily located data processing unit, which is hereby is hereby enabled to position the individual transporting or transported unit in the individual stack 43.

FIG. 2 is a block diagram view of the data processing unit in the towing and the towed or transported unit, respectively. As will be seen, the data processing facilities in the towing unit comprise interface couplings to the satellite, GSM and GPS system and have a wireless link 22 for use when communicating with the data processing unit 15 in the towed or transported unit. Further, 24 designates a read and write unit of the RFID type (Radio Frequency Identification Detection System) which, via the aerial 6 on the towing unit, can read information from or write information to a tag 10B located in a road or surface. The data processing system 15 in the transported unit has no direct connection to satellite, GPS and GSM systems, but can communicate via a wireless interface 22 with the data processing system in the towing unit as well as with stationarily located data processing systems of the same type as the one used in the towing unit. Further, the data processing unit has connected to it detectors, such as vibration detectors 28 and temperature sensors 29, as well as a power supply in the form of a battery 18. It will moreover be seen from the figure that more equipment may be coupled, as needed.

FIG. 3 schematically shows how the system operates in connection with a satellite, GPS and GSM system, the figure showing a train 34 which has a locomotive 35 and carriages 36. In connection with such a train, in which each carriage 36 has a data processing unit corresponding to the data processing unit 15 mentioned before, it is expedient that communications between the locomotive 35 and the carriages 36 are wireless as shown at 37. Further, communication between the towing unit 35 and the towed or transported units 36 may take place via fixed connections 38. It is also shown that the locomotive 35 can communicate via the GSM system 39 or additionally be connected to existing satellite-borne communications or positioning systems 45. Correspondingly, a road transport unit 40 is shown, in which communication between the towing and the towed or transported units likewise takes place via a wireless connection 37 or via a fixed connection 38 between the data processing systems of the two units, and communication with the outside world may be performed via the GSM system 39 or the satellite-based communications and positioning systems 45. The figure moreover shows a stationary data processing unit 42 that can be located at a terminal, parking ground or other location where communication with non-transported units 41/43 is to be established. In addition to communicating with the towing units, the stationary data processing system 42 can communicate with the outside world both via GSM 39 and satellite-based communications systems 45. Communication between the stationary data processing system 42 and the units 41/43 not in transport are wireless 37, but may also take place via the fixed connection 38. FIG. 3 additionally shows how a transporting unit 41 or a stacked transport unit 43 can communicate via the aerial 16 with the tag 10B located in a surface dressing, and thus contribute i.a. to position determination. FIG. 3 additionally shows schematically that stackable transport units 43 have tags 10A and aerials 16 in the top and the bottom, respectively, and can consequently read the underlying unit and thus contribute to the positioning of the individual stacked unit. Finally, FIG. 3 schematically shows how the same facilities in the transported units may be used, where a stationary data processing system is installed on a ship 46. In addition to the possibility of positioning the individual transport unit 43, communication between the individual transport unit and the outside world may be established by satellite or radio via the ordinary communications and positioning facilities of the ship.

Although the invention has been described in connection with towing and towed, transporting and transported units on land, it is within the scope of the invention to use the technique and procedure described above in closely related connections. Thus, the same invention may conceivably be used to watch containers in air traffic.

We claim:

1. A traffic supervision system for transport systems of the type comprising a towing unit and one or more transporting or transported units, said system comprising:

a data processing unit in the towing unit having transmit and receive facilities adapted to read/write messages from stationarily located transmit and receive facilities, the towed, transporting or transported units have another data processing unit having transmit and receive facilities capable of exchanging information with the data processing unit in the towing unit via a wireless transmission or via an interface wherein the transported unit or units have a first aerial capable of reading information from a tag which is located on the transporting unit.

2. A traffic supervision system according to claim 1, wherein the data processing unit of the towed, transporting or transported unit or units can additionally exchange information with local data processing units which are stationarily located outside the towing unit.

3. A traffic supervision system according to claim 1, wherein the transported unit or units have a tag from which and to which the data processing unit in the transported unit and the data processing system in the towing unit can receive and supply information related to the course of a transport concerned via an aerial in the transported unit and an aerial in the transporting unit.

4. A traffic supervision system according to claim 1, wherein the transporting or transported unit or units have a second tag which is located in the top of the unit.

5. A traffic supervision system according to claim 2, wherein the data processing unit of the towing unit and the stationarily located data processing units communicate with a satellite, GSM or GSP system.

6. A traffic supervision system according to claim 1, wherein sensors are connected to the data processing units of the transporting or transported unit or units.

7. A traffic supervision system according to claim 1, wherein the first aerial is adapted to read information from tags which are located outside the transporting or transported unit or units.

8. A traffic supervision system according to claim 1, wherein the transporting or transported unit or units have their own power supply.

* * * * *